(12) United States Patent
Van Hise et al.

(10) Patent No.: US 8,195,876 B2
(45) Date of Patent: Jun. 5, 2012

(54) ADAPTATION OF CONTENTIOUS STORAGE VIRTUALIZATION CONFIGURATIONS

(75) Inventors: David Gregory Van Hise, Tucson, AZ (US); Gregory John Tevis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 11/961,544

(22) Filed: Dec. 20, 2007

(65) Prior Publication Data

US 2009/0164716 A1    Jun. 25, 2009

(51) Int. Cl.
*G06F 13/00* (2006.01)
*G06F 13/28* (2006.01)

(52) U.S. Cl. ............. 711/114; 711/170; 711/E12.002; 713/1; 713/100

(58) Field of Classification Search ............. 711/114, 711/170, E12.002; 713/1, 100
See application file for complete search history.

(56) References Cited

U.S. PATENT DOCUMENTS

| 6,898,670 | B2 | 5/2005 | Nahum |
| 7,127,445 | B2 | 10/2006 | Mogi et al. |
| 2004/0123029 | A1* | 6/2004 | Dalal et al. ............ 711/114 |
| 2005/0108375 | A1 | 5/2005 | Hallak-Stamler et al. |

FOREIGN PATENT DOCUMENTS

| JP | 02006184981 A | 7/2006 |
| WO | WO 02/25870 | * 3/2002 |

OTHER PUBLICATIONS

"Vicom Storage Virtualization Engine," Copyright 2001 Vicom Systems, Inc., www.vicom.com.

* cited by examiner

*Primary Examiner* — Edward Dudek, Jr.
(74) *Attorney, Agent, or Firm* — Century IP Group, Inc.; F. Jason Far-hadian, Esq.

(57) ABSTRACT

Systems and methods for managing storage virtualization in a storage infrastructure are provided. The method comprises examining storage virtualization configurations across a data storage infrastructure having one or more data storage resources, such that configuration data associated with the storage virtualization configurations applied to the one or more data storage resources is stored in a configuration repository; analyzing the configuration data to detect storage virtualization policy inconsistencies and redundancies across the data storage infrastructure; and reporting potential problems associated with applying the storage virtualization configurations to said one or more data storage resources, in response to detecting the virtualization policy inconsistencies.

16 Claims, 6 Drawing Sheets

ADAPTATION OF CONTENTIOUS STORAGE VIRTUALIZATION CONFIGURATIONS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data storage systems and, more particularly, to detecting and resolving contention in storage virtualization configurations.

BACKGROUND

Virtualization typically refers to the abstraction of resources in a computing environment. A virtualization scheme may involve hiding the physical characteristics of the resources from the way in which other systems, applications, or end users interact with those resources. For example, a single physical resource (e.g., a server, an operating system, an application, or storage device) may be configured to appear to function as multiple logical resources; or alternatively multiple physical resources (e.g., storage devices or servers) may be configured to appear as a single logical resource.

Virtualization is, therefore, advantageous in instances where a separation or abstraction of physical media from the logical representation of the storage is useful to simplify system configuration and management. For example, virtualization of physical storage volumes into logical storage volumes allows physical infrastructure changes and data management operations to be performed while logical or virtual volumes remain unchanged. Virtualization can also improve the performance of data access and writes through caching and striping, and the availability of data through techniques like mirroring, and data striping with distributed parity.

Figure 1:
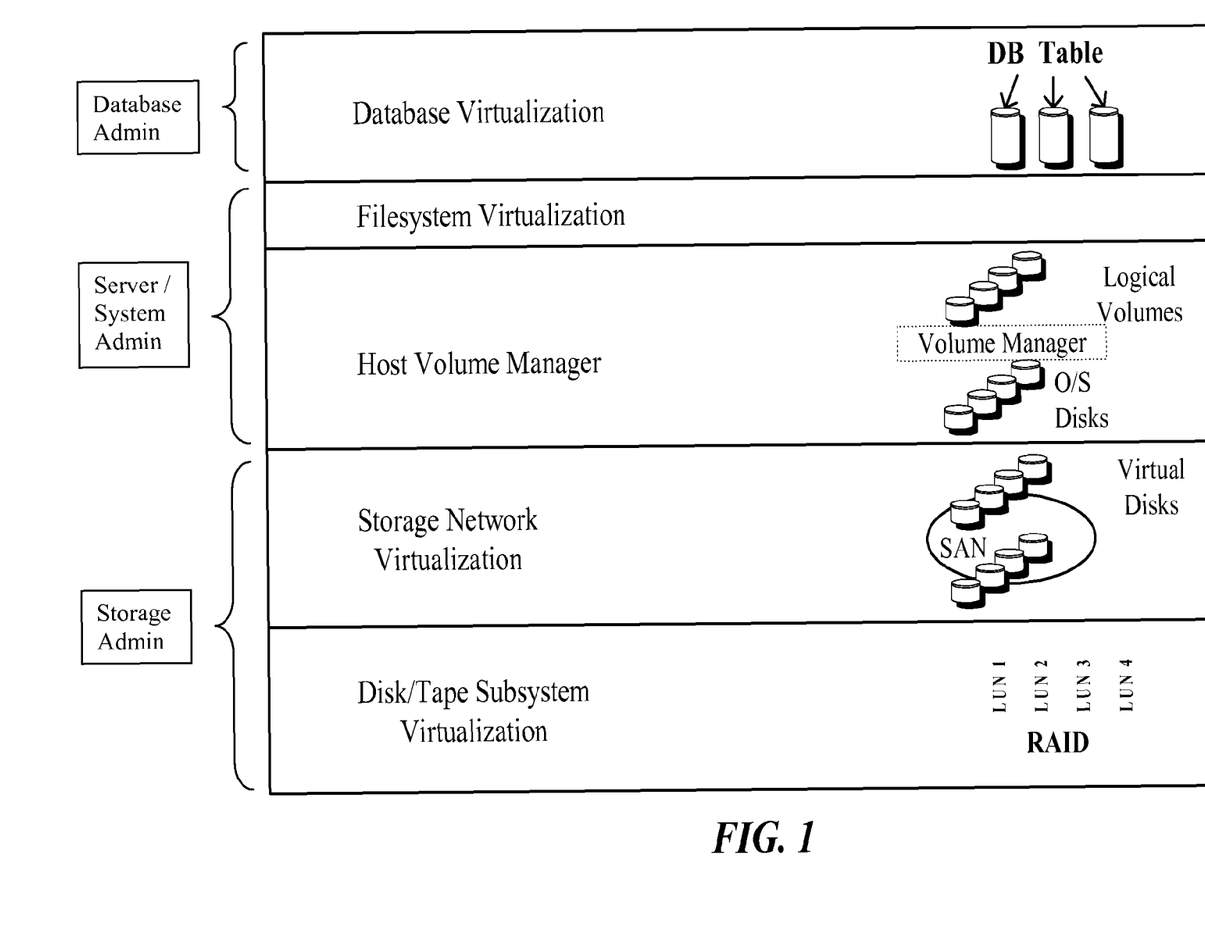
FIG. 1 illustrates exemplary virtualization levels in a data storage system, in accordance with one embodiment.

In a data storage system, particularly, several levels of virtualization are possible. Referring to FIG. 1, some storage virtualization levels may be defined as follows:

Database virtualization involving striping or other I/O optimization techniques performed across volumes by advanced databases (e.g., IBM® Universal DataBase). Databases can typically spread data across their table space containers and partitions through round robin or hashing techniques;

Filesystem virtualization involving striping performed at file level (e.g. IBM's General Parallel File System or GPFS);

Volume or block virtualization performed at multiple levels, such as host volume manager, network virtualization or storage subsystem. Redundant Array of Independent Drives (RAID) functionality can be implemented for performance (e.g. striping/RAID 0) and availability purposes (e.g. RAID 1 or RAID 5).

Storage network virtualization of volumes and RAID functions performed by storage subsystems (e.g., IBM's disk storage (DS) series or EMC's Symmetrix); and virtualization performed by virtual tape libraries (e.g., IBM's Virtual Tape Server or VTS).

Specific examples of block virtualization include:

volume virtualization and RAID functions performed by host volume managers and/or advanced operating systems (e.g., IBM's AIX Volume Manager or Symantec's Veritas Volume Manager); and volume virtualization and RAID functions performed by network based storage virtualization solutions (e.g., IBM's storage area network (SAN) Volume Controller);

As shown in FIG. 1, there are typically different users or administrative (admin) roles involved in creating optimized configurations, from their domain perspective at each virtualization level. This can lead to overall non-optimized virtualization configuration when analyzed across the entire system.

For example, at each virtualization level, one or perhaps more than one system administrator may try to use one or more of the above-mentioned different techniques to optimize the performance, security and integrity of stored data, for example, by way of managing caching, striping and redundancy of stored data.

In most cases, the administrator at one level does not have sufficient information about the optimization procedure and structure at the other levels. As a result, the optimization applied in one level may be redundant in light of optimization techniques applied at another level, or even in certain circumstances counterproductive.

Thus, methods and systems are needed that can overcome the aforementioned shortcomings.

SUMMARY

The present disclosure is directed to systems, methods and corresponding products that facilitate detecting and resolving contention in storage virtualization configurations.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

Systems and methods for managing storage virtualization in a storage infrastructure are provided. The method comprises examining storage virtualization configurations across a data storage infrastructure having one or more data storage resources, such that configuration data associated with the storage virtualization configurations applied to the one or more data storage resources is stored in a configuration repository; analyzing the configuration data to detect virtualization policy inconsistencies across the data storage infrastructure; and reporting potential problems associated with applying the storage virtualization configurations to said one or more data storage resources, in response to detecting the virtualization policy inconsistencies.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate detecting and resolving contention in storage virtualization configurations.

In accordance with one embodiment, an automated module monitors the various virtualization configurations used at different virtualization levels for a storage system. The automated module may maintain a log of the virtualization configurations and the related information. Desirably, the virtualization configuration data may be gathered or retrieved by the automated module, or collected based on a reporting implementation that causes the storage system components at each level provide the needed information.

Once the virtualization configuration data and the related information are collected, the automated module analyzes the information to determine if there are any inconsistent, inefficient or redundant virtualization instances that can be eliminated. In one embodiment, an agent may be enabled to remove the redundant or inconsistent instances from the storage policy by updating the virtualization configuration data at different levels. In another embodiment, an analytical report may be generated that may be used by a human operator or other independent entity, wherein the report provides the troublesome areas and possible solutions to correcting the problems.

The configuration information may be related to applying different RAID, mirroring or caching policies to different virtualization levels, either using a vertical approach across different virtualization levels or horizontally on one virtualization level with respect to data or files managed and accessed at that level.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 2A:
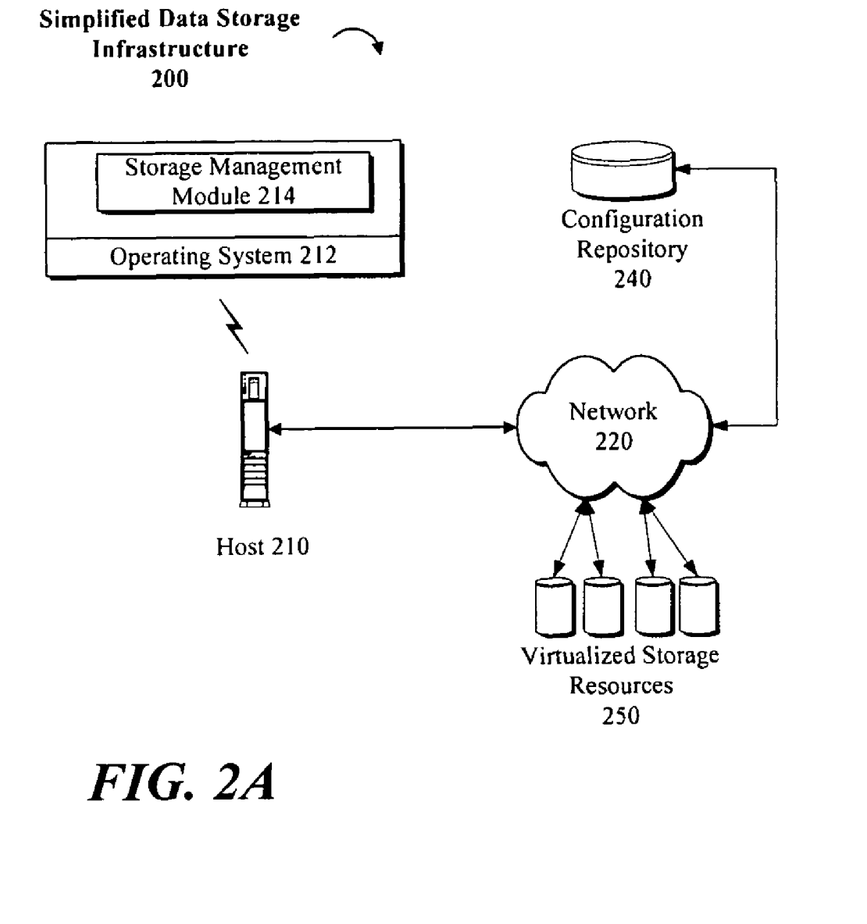
FIG. 2A is a block diagram of a data storage infrastructure, in accordance with an exemplary embodiment.

Referring to FIG. 2A, a simplified data storage infrastructure 200 according to one embodiment comprises a host (e.g., a computing system) 210 connected to virtualized storage resources (e.g., a SAN) 250 over a network 220. Host 210 may be also connected to a configuration repository 240 either locally or by way of network 220. A storage management module 214 may be executed on top of an operating system 212 on host 210 for the purpose of detecting and resolving contention in storage virtualization configurations for the virtualized storage resources 250, as provided in more detail below.

Figure 2B:
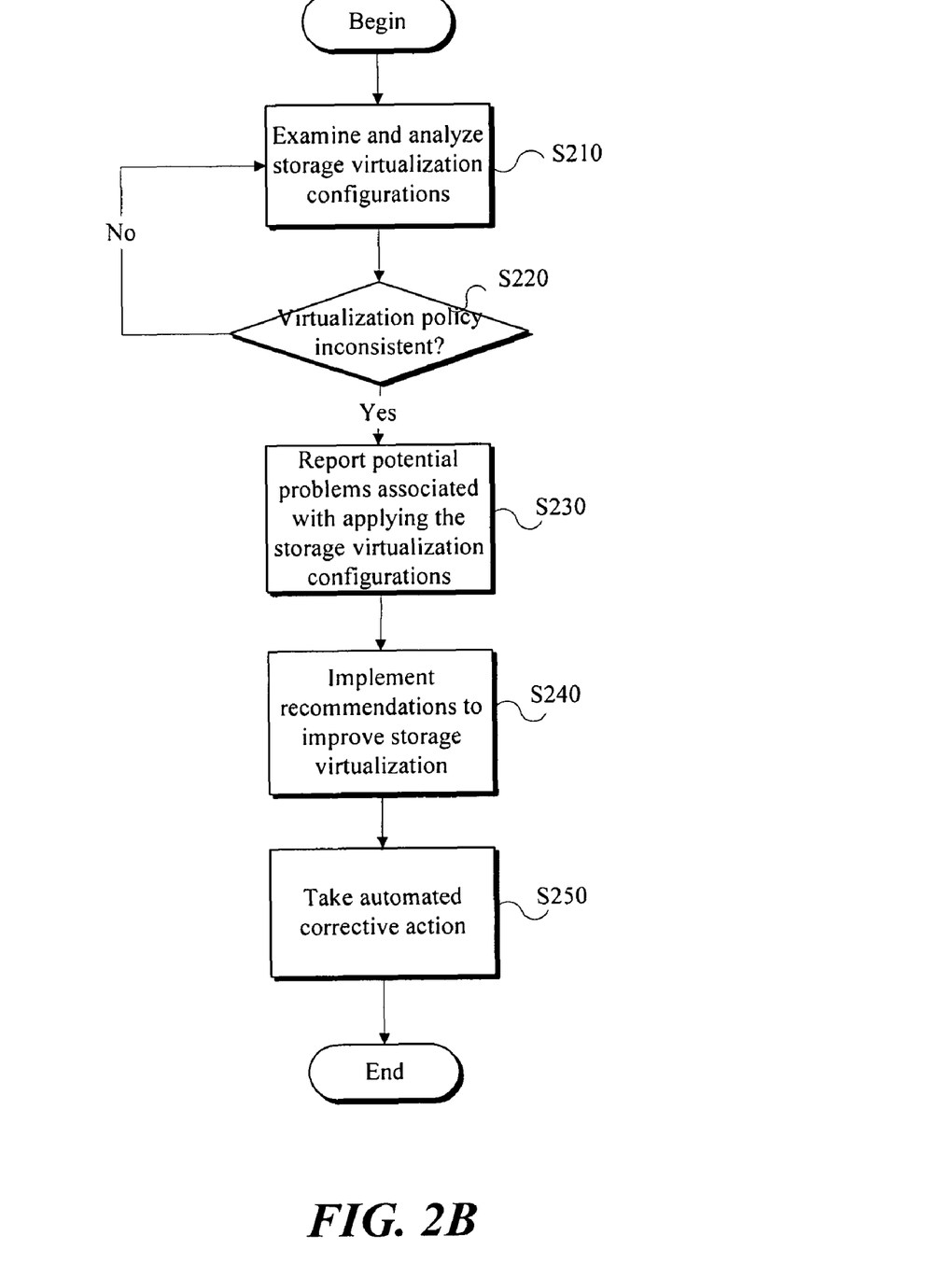
FIG. 2B is a block diagram of a method of improving efficiency of a virtualized data storage infrastructure, in accordance with an exemplary embodiment.

Referring now to both FIGS. 2A and 2B, storage management module 214 (e.g., the IBM® Totalstorage Productivity Center (TPC)) may be configured to consolidate and correlate storage virtualization configurations for different virtualization levels across data storage infrastructure 200. The configuration data associated with the storage virtualization configurations identifies the configurations applied to virtualized storage resources 250. The configuration data once consolidated and correlated may be stored in configuration repository 240.

Module 214, in one embodiment, is configured to retrieve the configuration data from configuration repository 240. To determine virtualization policy inconsistencies or redundancies across data storage infrastructure 200, module 214 may examine and analyze the configuration data stored in configuration repository 240 (S210); and in case of determining virtualization policy inconsistencies (S220) report potential problems associated with applying the storage virtualization configurations to virtualized storage resources 250 (S230).

In some embodiments, module 214 may automatically implement recommendations for corrective action to be taken (S240) to improve storage virtualization at different levels as applied to virtualized storage resources 250, in response to detecting the virtualization policy inconsistencies. Thereafter, either module 214 or other independent entity (e.g., human operator, or software healing agent) may take corrective action to improve storage virtualization according to the implemented recommendations (S250).

The configuration data stored in configuration repository 240 in addition to storage virtualization configurations may also include volume mappings associated with the storage virtualization configurations for said one or more virtualized storage resources 250. In some embodiments, storage management module 214 may comprise one or more modules configured to consolidate and correlate the configuration and volume mappings data associated with virtualized storage resources 250 and their respective components.

Said components may comprise at least one of an application executed on a host system in the data storage infrastructure, filesystems executed on a server system in the storage infrastructure, an operating system executed on a server system in the storage infrastructure, or a database, a SAN networking device, a disk storage subsystem and volume, or a tape subsystem and volume, for example.

Figure 3:
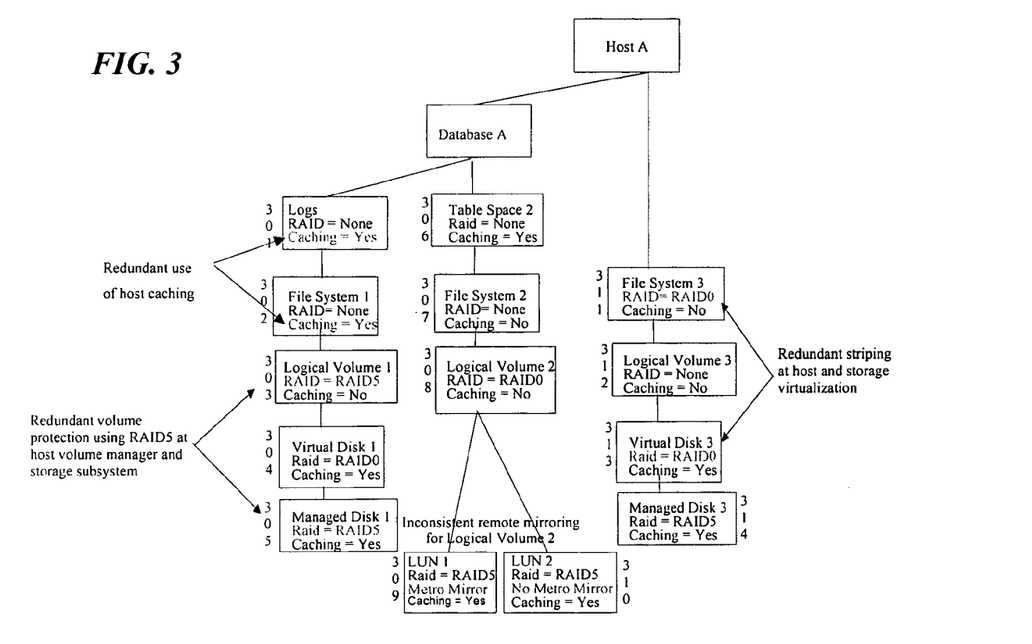
FIG. 3 is a block diagram of one or more inconsistencies that may be present in a virtualized data storage system, in accordance with one embodiment.

Referring to FIG. 3, a logical conceptual view of different virtualization levels for an exemplary data storage infrastructure 200 is provided at a storage resource level. Examples of a storage resource include a logical unit number (LUN) or volume as detected by operating system 212, and database tables associated with database A. At the storage resource level (e.g., LUN or database table), the above noted method may be used to examine one or more associated virtualization definitions, configurations, and mappings for virtualized storage resources 250.

Advanced storage resource management (SRM) products may be utilized in certain exemplary embodiments to detect and capture at least a portion of the virtualization mappings of resources 250. The captured information may detect and indicate levels of virtualization associated with selected resources 250, by way of generating a report, for example. The report may provide a consolidated and correlated view of storage virtualization and volume mappings.

Referring to FIG. 3, nodes 301 through 314 illustrate an example of such a consolidated and correlated view as a virtualization dependency graph representing various levels of virtualization associated, in this example, with database A. As shown, discovering and understanding the virtualizations associated with one or more storage resources 250 may generate a graph with multiple nodes and cross relations among said nodes. Also included in the graph may be an analysis of the storage virtualization configurations.

For example, nodes 301 and 302 in FIG. 3 illustrate that at two separate vertically implemented virtualization levels a caching scheme is utilized. Since the two levels are vertically implemented, module 214 may detect a redundancy in caching between the two levels and either generate an alert to a human operator or alternatively instruct a healing agent to remove the application of a caching scheme from one of said virtualization levels.

As another example, nodes 303 and 305 in FIG. 3 illustrate that a RAID5 scheme is applied to two separate vertically implemented virtualization levels. Again, since the two levels are vertically implemented, module 214 may detect a redundancy in applying a RAID scheme between the two levels and either generate an alert to a human operator or alternatively instruct a healing agent to remove the RAID scheme from one level. Other exemplary nodes 309, 310 and 311, 313 respectively illustrate inconsistent remote mirroring and redundant striping configurations at different virtualization levels, which may be detected and corrected by module 214, depending on implementation.

In one embodiment, module 214 is configured to perform correlated analysis by setting certain virtualization configuration policy parameters. In another embodiment, said policy parameters may be set by a human administrator, for example. Violations of these policy parameters may be detected by module 214 and automated responsive actions may be implemented or set into effect. A responsive action may involve logging the detected event, reporting the event, recommending specific corrective action, or taking automated actions to correct any discrepancies or redundancies.

Accordingly, one or more embodiments are implemented to provide detailed analysis and information about configuration and mapping at different virtualization levels to assist administrators with easily and automatically detecting esoteric storage infrastructure configuration conditions, without having to manually perform an analytical dissection of various virtualization levels across a storage infrastructure, which is almost practically impossible.

In certain embodiments, one or more algorithms may be implemented to detect redundant or inconsistent virtualization configurations and behaviors at multiple levels in the I/O path from a host resource to storage subsystems. Such algorithms may utilize configuration data and related information that have been collected and stored in configuration repository (e.g., a TPC database) 240 to identify, report and desirably update virtualization configurations that may be introducing non-optimized, inconsistent or redundant data storage policies that are harmful to maintaining the efficiency and integrity of virtualized storage resources 250.

In different embodiments, the invention can be implemented either entirely in the form of hardware or entirely in the form of software, or a combination of both hardware and software elements. For example, host 210 may comprise a controlled computing system environment that can be presented largely in terms of hardware components and software code executed to perform processes that achieve the results contemplated by the system of the present invention.

Figure 4:
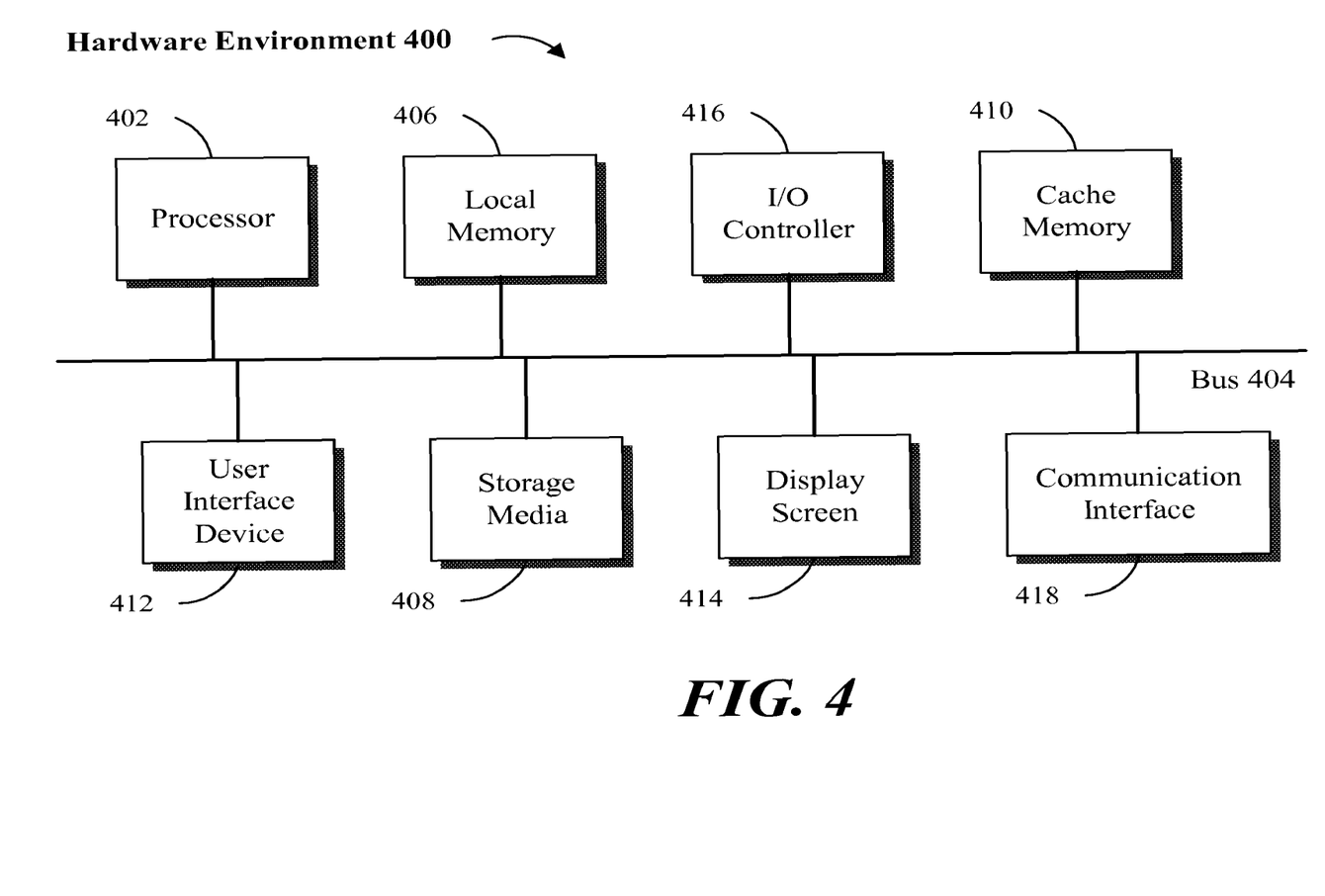
FIGS. 4 and 5 are block diagrams of hardware and software environments in which a system of the present invention may operate, in accordance with one or more embodiments.
Figure 5:
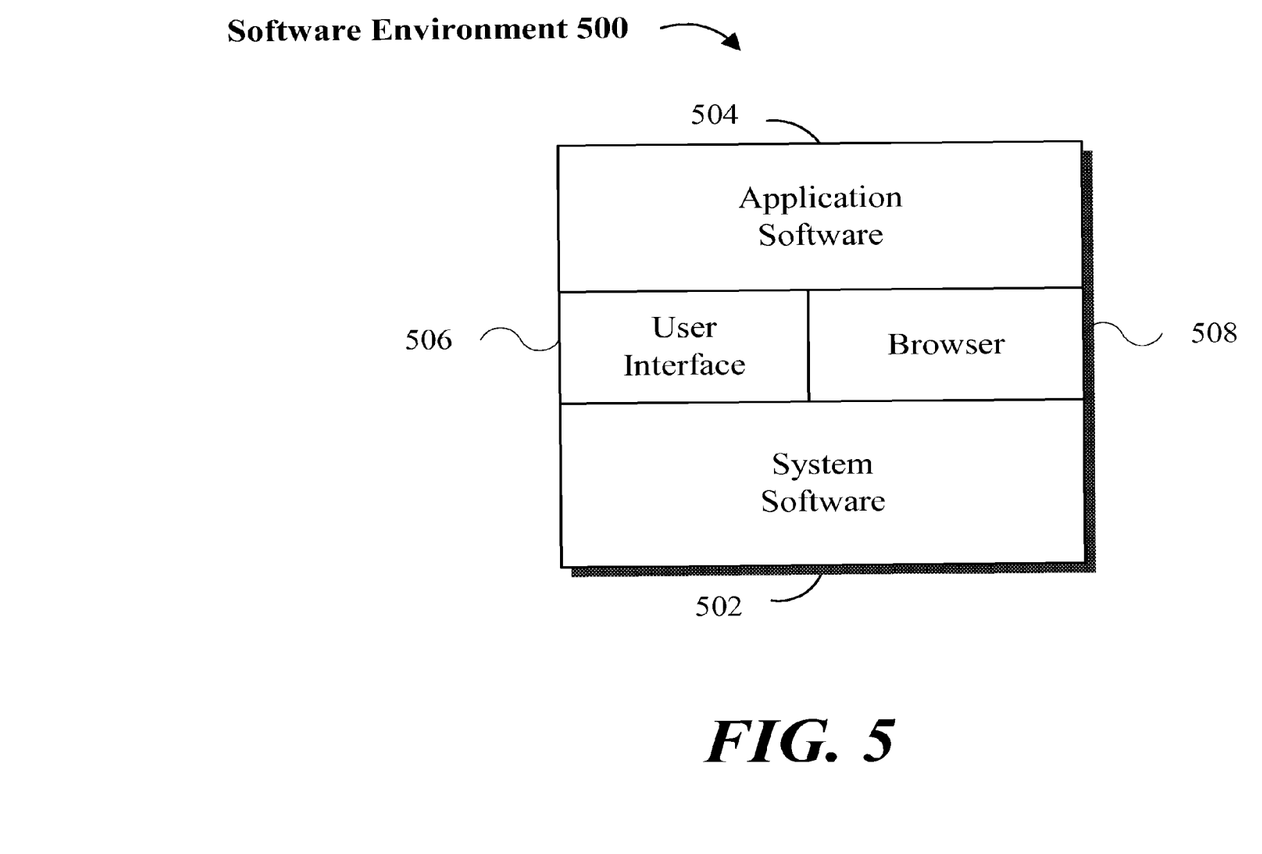

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, storage management module 214 may be implemented as system software 502 or application software 504 executed on one or more hardware environments to improve virtualization efficiency in a storage network. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the storage management module 214 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, storage management module 214 can comprise one or more computer programs that are executed on top of operating system 212 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for managing storage virtualization in a storage infrastructure, the method comprising:

examining storage virtualization configurations across a data storage infrastructure having one or more data storage resources, such that configuration data associated with the storage virtualization configurations applied to the one or more data storage resources is stored in a configuration repository, wherein the configuration data indicates levels of virtualization associated with selected data storage resources;

analyzing the configuration data to detect virtualization policy inconsistencies and redundancies across the data storage infrastructure as related to the selected data storage resources; and reporting potential problems associated with applying the storage virtualization configurations to said one or more data storage resources, in response to detecting a virtualization policy violation, wherein the virtualization policy violation comprises a consolidated and correlated indication of redundancies or inconsistencies detected in the data storage infrastructure based on a virtualized mapping of said selected data storage resources.

2. The method of claim 1, wherein the configuration data comprises volume mappings associated with the storage virtualization configurations for said one or more data storage resources.

3. The method of claim 1, wherein a storage management module retrieves the configuration data from the configuration repository to determine storage virtualization policy inconsistencies and redundancies across the data storage infrastructure.

4. The method of claim 3, wherein the data storage infrastructure comprises a host system connected to at least one storage area network (SAN).

5. The method of claim 4, wherein the storage management module comprises one or more modules configured to consolidate and correlate the configuration data and volume mappings associated with a plurality of SAN components.

6. The method of claim 5, wherein the SAN components comprise an application executed on a host system in the data storage infrastructure.

7. The method of claim 5, wherein the SAN components comprise file systems executed on a server system in the storage infrastructure.

8. The method of claim 5, wherein the SAN components comprise an operating system executed on a server system in the storage infrastructure.

9. The method of claim 5, wherein the SAN components comprise at least one of a database, a SAN networking device, a disk storage subsystem and volume, or a tape subsystem and volume.

10. A machine-implemented system for managing storage virtualization in a storage infrastructure, the system comprising:

a logic unit for examining storage virtualization configurations across a data storage infrastructure having one or more data storage resources, such that configuration data associated with the storage virtualization configurations applied to the one or more data storage resources is stored in a configuration repository, wherein the configuration data indicates levels of virtualization associated with selected data storage resources;

a logic unit for analyzing the configuration data to detect virtualization policy inconsistencies and redundancies across the data storage infrastructure, as related to the selected data storage resources; and a logic unit for reporting potential problems associated with applying the storage virtualization configurations to said one or more data storage resources, in response to detecting the virtualization policy inconsistencies, wherein the virtualization policy violation comprises a consolidated and correlated indication of redundancies or inconsistencies detected in the data storage infrastructure based on a virtualized mapping of said selected data storage resources.

11. The system of claim 10, wherein the configuration data comprises volume mappings associated with the storage virtualization configurations for said one or more data storage resources.

12. The system of claim 10, wherein a storage management module retrieves the configuration data from the configuration repository to determine storage virtualization policy inconsistencies and redundancies across the data storage infrastructure.

13. A computer program product comprising a non-transitory data storage medium having a computer readable program, wherein the computer readable program when executed on a computer causes the computer to:

examine storage virtualization configurations across a data storage infrastructure having one or more data storage resources, such that configuration data associated with the storage virtualization configurations applied to the one or more data storage resources is stored in a configuration repository, wherein the configuration data indicates levels of virtualization associated with selected data storage resources;

analyze the configuration data to detect virtualization policy inconsistencies and redundancies across the data storage infrastructure, as related to the selected data storage resources; and report potential problems associated with applying the storage virtualization configurations to said one or more data storage resources, in response to detecting the virtualization policy inconsistencies, wherein the virtualization policy violation comprises a consolidated and correlated indication of redundancies or inconsistencies detected in the data storage infrastructure based on a virtualized mapping of said selected data storage resources.

14. The computer program product of claim 13, wherein the configuration data comprises volume mappings associated with the storage virtualization configurations for said one or more data storage resources.

15. The computer program product of claim 13, wherein a storage management module retrieves the configuration data from the configuration repository to determine virtualization policy inconsistencies and redundancies across the data storage infrastructure.

16. The computer program product of claim 13, wherein the data storage infrastructure comprises a host system connected to at least one storage area network (SAN).

* * * * *